United States Patent [19]

Shibata et al.

[11] Patent Number: 5,472,030
[45] Date of Patent: Dec. 5, 1995

[54] PNEUMATIC TIRE

[75] Inventors: Kouji Shibata, Nishinomiya; Yoshiaki Uemura, Kobe, both of Japan

[73] Assignee: Sumitomo Rubber Industries, Ltd., Japan

[21] Appl. No.: 261,091

[22] Filed: Jun. 16, 1994

Related U.S. Application Data

[62] Division of Ser. No. 148,913, Nov. 5, 1993.

[51] Int. Cl.$^6$ .......................... B60C 11/04; B60C 11/117
[52] U.S. Cl. .................................................. 152/209 R
[58] Field of Search .......................... 152/209 R, 209 D, 152/209 A

[56] References Cited

U.S. PATENT DOCUMENTS

| | | | |
|---|---|---|---|
| 4,726,407 | 2/1988 | Hayakawa et al. | 152/209 R |
| 4,736,782 | 4/1988 | Kanamaru | 152/209 R |
| 4,785,863 | 11/1988 | Tsuda et al. | 152/209 R X |

FOREIGN PATENT DOCUMENTS

| | | | |
|---|---|---|---|
| 997729 | 1/1952 | France . | |
| 2398625 | 2/1979 | France . | |
| 3431655 | 3/1986 | Germany . | |
| 3139402 | 6/1991 | Japan . | |
| 139402 | 6/1991 | Japan | B60C 3/04 |
| 432890 | 11/1992 | Japan | |
| 4,359,442 | 12/1992 | Japan | |

*Primary Examiner*—Michael W. Ball
*Assistant Examiner*—Francis J. Lorin

[57] ABSTRACT

A pneumatic tire, which comprises a tread portion provided with a circumferential groove having a pair of side walls, in the axial direction of the tire the circumferential groove is disposed within the ground contacting width of the tread under a standard loaded state, the standard loaded state is such that the tire is mounted on its regular rim and inflated to 70% of its maximum air pressure and then loaded with 88% of its maximum load, the axial width of the circumferential groove is in the range of from 0.2 to 0.35 times the ground contacting width, and at least one of the side walls has a nonrectilinear configuration having a plurality of axially deviated parts, whereby the conditions of the resonance of the air in the circumferential groove are continuously changed every moment during running to decrease air resonance noise thereby effectively reducing the tire noise.

13 Claims, 9 Drawing Sheets

PNEUMATIC TIRE

This application is a divisional of copending application Ser. No. 08/148,913, filed Nov. 5, 1993.

FIELD OF THE INVENTION

The present invention relates to a pneumatic tire in which tire noise is reduced without deteriorating wet performance.

BACKGROUND OF THE INVENTION

Recently, as the noise generated by the car mechanism and body becomes reduced, the percentage of the noise generated by the tire increases. Therefore, there is an increasing demand for a low noise tire.

For reducing the tire noise, it is especially effective to reduce a relatively high frequency noise to which the human ears are sensitive, that is, noise whose frequency range is around 1 kHz.

Air resonance noise is such a high frequency tire noise. Air resonance noise is explained as follows.

In the ground contacting patch of the tire, an air tube is formed by the road surface and a continuous circumferential groove which is provided in the tire tread portion. During running, the air tube is excited by the air flow, a tread deformation or movement, roughness of the road surface and the like, and a noisy sound having a specific wave length which corresponds to two times the length of the air tube is generated. Most tire noise whose frequency range is about 800 to 1.2 k Hz generated by the tire having a circumferential groove is such air resonance noise. The frequency of the air resonance is almost constant independent of running speed.

Since it has been known that air resonance can be prevented by decreasing groove volume, decreasing groove volume and/or the number of circumferential grooves has been employed to reduce air resonance noise. As a result, wet performance such as aquaplaning, wet grip and the like is inevitably decreased.

It is therefore, an object of the present invention to provide a pneumatic tire in which, by using a very wide circumferential groove and continuously changing the conditions of the air resonance during running, the air resonance noise is effectively reduced to decrease the overall noise level without sacrificing wet performance.

The foregoing specific objects and advantages of the invention are illustrative of those which can be achieved by the present invention and are not intended to be exhaustive or limiting of the possible advantages which can be realized. Thus these and other objects and advantages of the invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown described.

SUMMARY OF THE INVENTION

According to one aspect of the present invention a pneumatic tire comprises a tread portion provided with a circumferential groove having a pair of side walls, in the axial direction of the tire the circumferential groove is disposed within the ground contacting width of the tread under a standard loaded state, the standard loaded state is such that the tire is mounted on its regular rim and inflated to 70% of its maximum air pressure and then loaded with 88% of its maximum load, the axial width of the circumferential groove is in the range of from between 0.2 to 0.35 times the ground contacting width, and at least one of the side walls has a nonrectilinear configuration having a plurality of axially deviated parts.

It will be appreciated by those skilled in the art that the foregoing brief description and the following detailed description are exemplary and explanatory of the invention, but are not intended to be restrictive thereof or limiting of the advantages which can be achieved by the invention. Thus the accompanying drawings, referred to herein and constituting a part hereof, illustrate preferred embodiments of the invention and, together with the detailed description, serve to explain the principles of the invention.

BRIEF DESCRIPTION OF THE DRAWINGS

The above and other objects, features and advantages of this invention will be apparent from the following detailed description, especially when taken in conjunction with the accompanying drawings, wherein.

DETAILED DESCRIPTION OF THE PREFERRED EMBODIMENTS

The present invention can be applied to various types of tires, but suitably applied to a low aspect ratio passenger radial tire.

Figure 1:
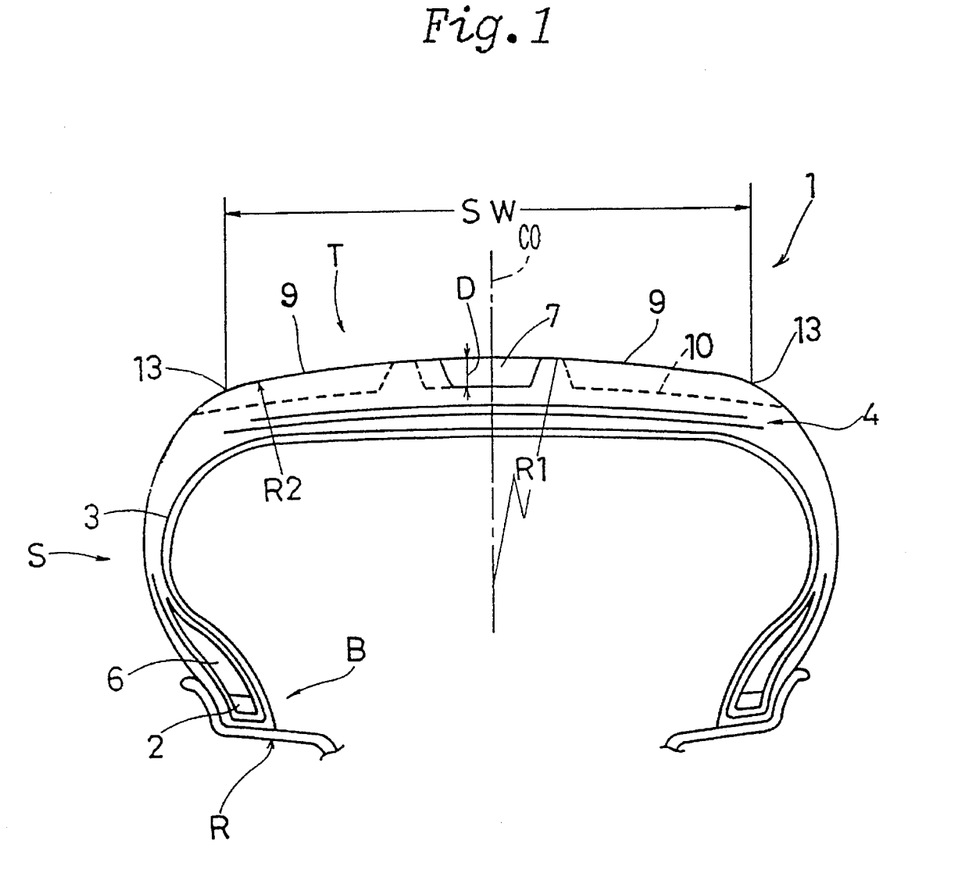
FIG. 1 is a cross sectional view of a pneumatic tire according to the present invention.

FIG. 1 shows an example of the tire structure for a low aspect ratio passenger radial tire, in which the tire 1 comprises a tread portion T, a pair of axially spaced bead portions B, a pair of sidewall portions S extending between the tread edges and the bead portions, a pair of bead cores 2 each disposed in each of the bead portions, a radial carcass 3 extending between the bead portions and turned up around the bead cores 2 from axially inside to outside of the tire, a belt 4 disposed radially outside the carcass and inside a rubber tread, and a bead apex 6 disposed radially outside each bead core 2 and between the main portion and each turned up portion of the carcass.

The carcass 3 comprises at least one ply of radially arranged organic fiber cords, e.g. nylon, rayon, polyester and the like.

The belt 4 comprises at least two cross plies of high modulus cords such as steel, aromatic polyamide and the like, laid at a relatively small angle of from 15 to 30 degrees with respect to the tire circumferential direction.

The aspect ratio (height/width ratio) of the tire 1 is in the range of from about 0.4 to 0.6.

The tread portion T is provided with a convex profile. The tread profile may be of a single radius curvature, but in general, the tread profile has a multi-radius curvature such that a major central portion thereof has a single radius R1 larger than the radius R2 of the shoulder portions, and the central portion and shoulder portions are continued without forming an angle.

The tread portion T is provided with a wide circumferential groove 7 extending continuously in the tire circumferential direction of the tire and a plurality of axial grooves.

In the present invention, a state of the tire which is mounted on its regular rim R and inflated to 70% of its maximum air pressure and then loaded with 88% of its maximum load, is referred to as the standard loaded state. In this regard, the maximum air pressure and the maximum load are those officially specified for the tire by for example JATMA (Japan), TRA (USA), ETRTO (Europe) and the like, and the regular rim is a rim officially specified for the tire by the same associations for the purpose of measuring the tire dimensions.

According to the present invention, the circumferential groove 7 has a very large width as compared with conventional widths.

The width ratio Wg/Sw of the axial width Wg of the circumferential groove 7 to the ground contacting width Sw is in the range of from 0.20 to 0.35. The ground contacting width Sw is the maximum axial width of the ground contacting area S under the above-mentioned standard loaded state.

In the case of passenger radial tires, for which the nominal section width in a metric tire size designation is in the range of from 155 to 225, the width Wg of the circumferential groove 7 is in the range of from 30 to 70 mm, preferably, 35 to 50 mm.

Figure 2:
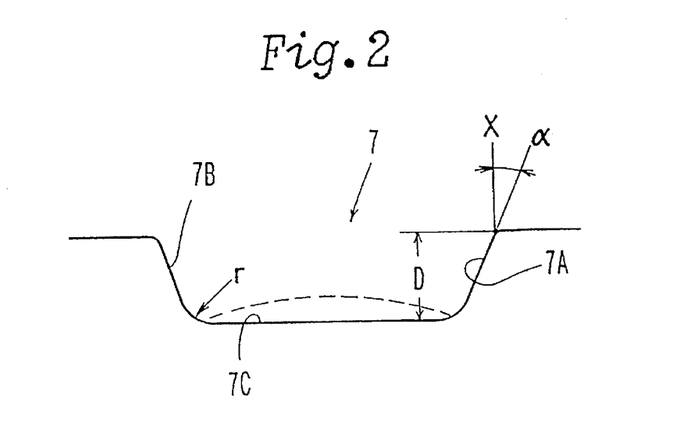
FIG. 2 is a cross sectional view of the circumferential groove thereof.

As shown in FIG. 2, the circumferential groove 7 has a flat bottom 7C and a pair of side walls 7A and 7B. The radially inner end of each of the side walls 7A and 7B is inclined to the center of the groove, and the inclination angle (alpha) thereof is 0 to 30 degrees, preferably 5 to 20 degrees, with respect to a radial line X at a right angle to the tire axis.

The intersecting part between the groove bottom 7C and the side walls 7A and 7B is rounded by a small radius (r) of curvature. The radius (r) is in the range of from 0.1 to 0.5 times the groove depth D. However, the intersecting part between the tread face and the side walls 7A and 7B is edged thereby improving the road grip.

The groove depth D of the circumferential groove 7 is set in the range of from 10 to 20% of the width Wg.

In the above-mentioned passenger tires, the depth D is preferably set in the range of from 5 to 10 mm. If the depth is less than 5 mm, the drainage performance is low. If the depth is more than 10 mm, it becomes necessary to increase the tread rubber thickness, which results in an increase in the tire weight, which is especially undesirable for passenger tires.

Further, the circumferential groove 7 is disposed within a tread central region which comprises about 70% of the width of the ground contacting width Sw and is centered on the tire equator CO. If the circumferential groove 7 protrudes from this region, the vibration mode of the belt edge excites the air resonance of the circumferential groove 7 to increasing resonance noise.

As explained above, by setting the groove width relatively large, in the circumferential center of the ground contacting part of the tread, the bottom of the circumferential groove 7 becomes convex as shown by exaggeration in FIG. 2 by the broken line. Further, the tread rubber is compressed. Accordingly, the cross sectional area of the middle groove part becomes smaller than the forward and backward groove part. As a result, the resonance produced by the groove is altered in order to thereby reduce the resonance noise.

If the width ratio Wg/Sw is less than 0.20, an effective deformation of the groove or air tube cannot be obtained, and therefore the air resonance noise is not reduced, and further an aquaplaning phenomenon is liable to occur. If the width ratio Wg/Sw exceeds 0.35, the noise reduction effect does not increase any more, but the cornering force is decreased and the dry grip performance and steering stability are deteriorated.

In the present invention, in order to eliminate the source of resonance noise, a circumferentially continuous groove which has a conventional width ranging from about 10 to 20 mm is not provided in the tread portion. A very narrow groove and a zero-width cut can be provided, but preferably, only one circumferential groove 7 is provided.

By the circumferential groove 7, the tread portion T is divided into two lateral tread parts 9.

Each lateral tread part 9 is provided with a plurality of axial grooves 10 so as to set a sea/land ratio Ss/Sr in the range of from 0.30 to 0.50. Here, the sea/land Patio Ss/Sr is a ratio of the sea area Ss to the land area Sr, both in the above-mentioned ground contacting area S under the standard loaded state. The sea area Ss is the total area of the grooved part, and the land area Sr is the total area of the remaining part or the actual ground contacting area.

If the sea/land ratio Ss/Sr is less than 0.30, the wet grip performance especially during cornering is deteriorated. If the sea/land ratio Ss/Sr is more than 0.50, the cornering force is decreased to deteriorate the steering stability.

As explained above, air resonance noise is effectively reduced by setting the width of the circumferential groove 7 over the conventional width range.

However, it was discovered that a further noise reduction can be achieved by continuously changing the resonance mode during running. To achieve this, at least one of the side walls 7A and 7B is formed in a nonrectilinear configuration, e.g. zigzag, wavy, stepped and the like so as to form portions having an axial deviation along the tire circumferential direction.

Figure 3:
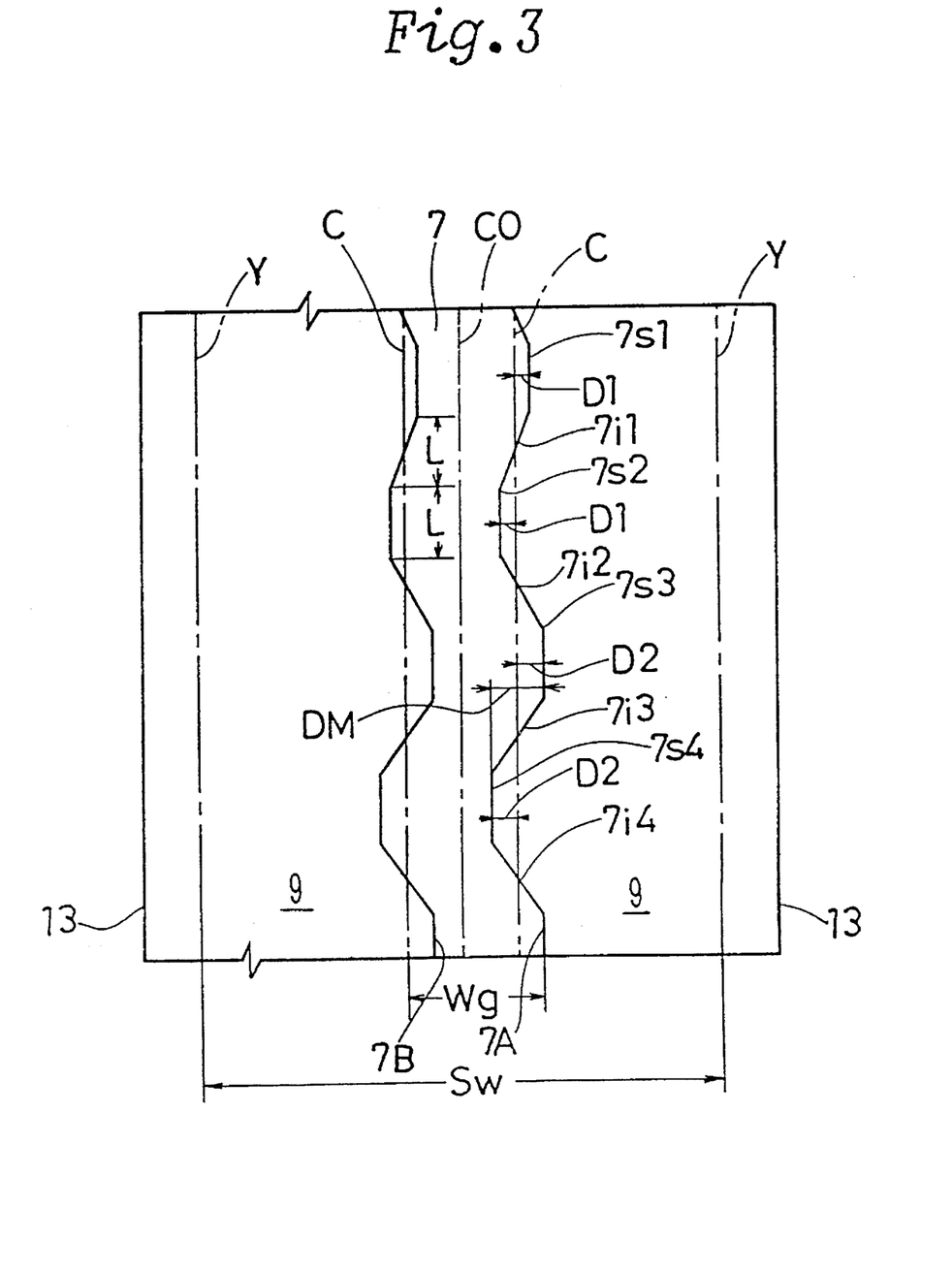
FIG. 3 is a plan view showing an example of the configuration of the circumferential groove.

FIG. 3 shows an example of the configuration of the circumferential groove 7. In this example, both the side walls 7A and 7B extend in a zigzag configuration. The zigzag of each side wall 7A, 7B consists of two different cycles having different amplitudes and arranged alternately in the tire circumferential direction. However, the zigzag pattern can be made up of more than two different cycles or only one cycle.

Each zigzag cycle is defined by straight circumferential segments ($7s1$, $7s2$, $7s3$, $7s4$) extending parallel with the tire equator CO, and starlight inclined segments ($7i1$, $7i2$, $7i3$, $7i4$) extending between the adjacent circumferential segments. The straight circumferential segments ($7s1$, $7s2$) have deviations D1 from the center line C, which have the same smaller amplitude but in the opposite directions. The straight circumferential segments ($7s3$, $7s4$) have deviations D2 from the center line C, which have the same larger amplitude but in the opposite directions. All the circumferential segments $7s1$ to $7s4$ and the inclined segments $7i\,1$ to $7i4$ have substantially the same circumferential length L. However, the circumferential lengths of the segments can be varied from one another. Further, the circumferential lengths of the zigzag cycles can be varied.

The side walls 7A and 7B are in parallel with each other. However, the zigzag configuration of one of the side walls 7A and 7B can be shifted from that of the other in the tire circumferential direction.

Preferably, the peak-to-peak amplitude DM of deviation is smaller than 30%, more preferably smaller than 20% of the above-mentioned ground contacting width Sw. The peak-to-peak amplitude is the axial distance between the circumferentially adjacent peaks of the opposite deviations. If the peak-to-peak amplitude DM exceeds 30%, the drainage of the circumferential groove becomes decreased, and the resultant protruding part of the tread rubber into the groove is liable to wear earlier and uneven wear starts therefrom.

If the axial width of the circumferential groove 7 is changed in the tire circumferential direction due to the deviation, the mean axial width is used for the above-mentioned axial width Wg.

Figure 4:
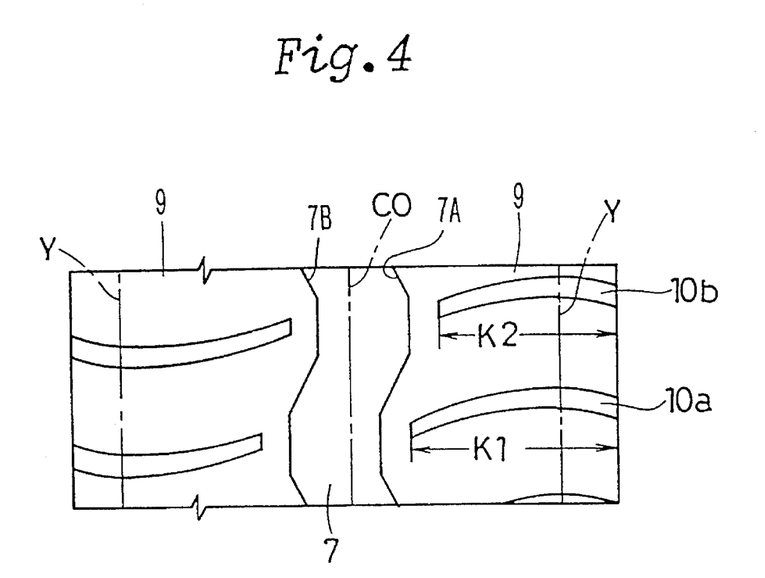
FIG. 4 is a plan view showing an example of a tread pattern in which the circumferential groove of FIG. 3 is used.
Figure 5:
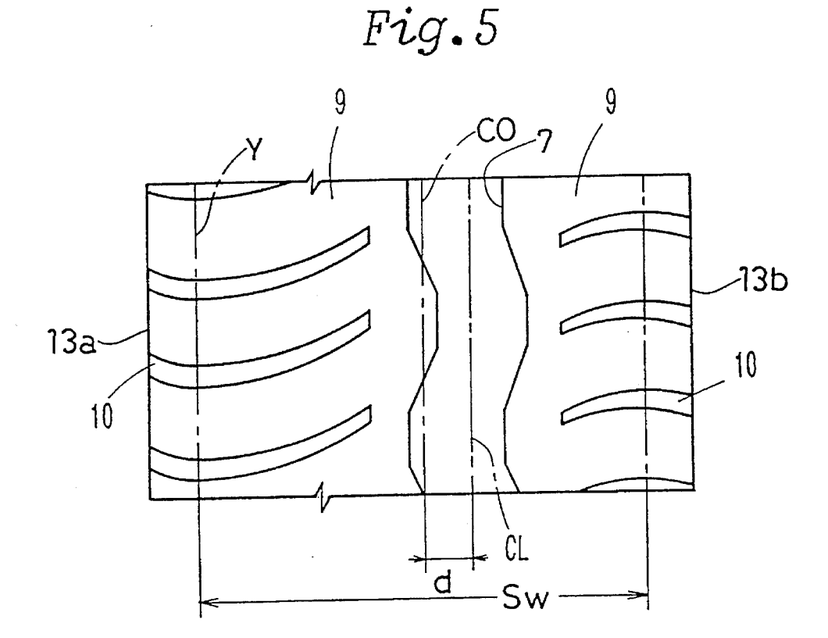
FIG. 5 is a plan view showing another example of the tread pattern in which the circumferential groove of FIG. 3 is used.

In practice, the circumferential groove 7 of FIG. 3 is used in combination with the axial grooves as shown in FIGS. 4 and 5.

In an example of the tread pattern shown in FIG. 4, the circumferential groove 7 is centered on the tire equator CO, and a plurality of axial grooves 10 ($10a$, $10b$) are disposed on each side of the circumferential groove 7. In this example, the axial lengths K1 and K2 of the axial grooves $10a$ and $10b$ respectively, are varied in proportion to the axial width of the lateral tread part 9 measured from each tread edge to the circumferential groove 7, whereby the variation of the tread rigidity in the tire circumferential direction is decreased and the running stability and uneven wear can be improved.

In another example of the tread pattern shown in FIG. 5, the circumferential groove 7 is disposed asymmetrically about the tire equator CO. The center line CL of the circumferential groove 7 is set aside from the tire equator CO by a distance (d). Preferably, the distance (d) is less than about 20% of the ground contacting width Sw.

The tire having this asymmetrical tread pattern is used so that the tread edge $13a$ being farther from the circumferential groove 7 is located on the outside of a car, and the nearer tread edge $13b$ on the inside of the car, whereby the outside tread part, which is subjected to a larger load than the inside tread part during cornering, is increased in rigidity to improve cornering performance. In this example, the axial lengths of the axial grooves 10 disposed on each side of the circumferential groove 7 are not varied.

Figure 6:
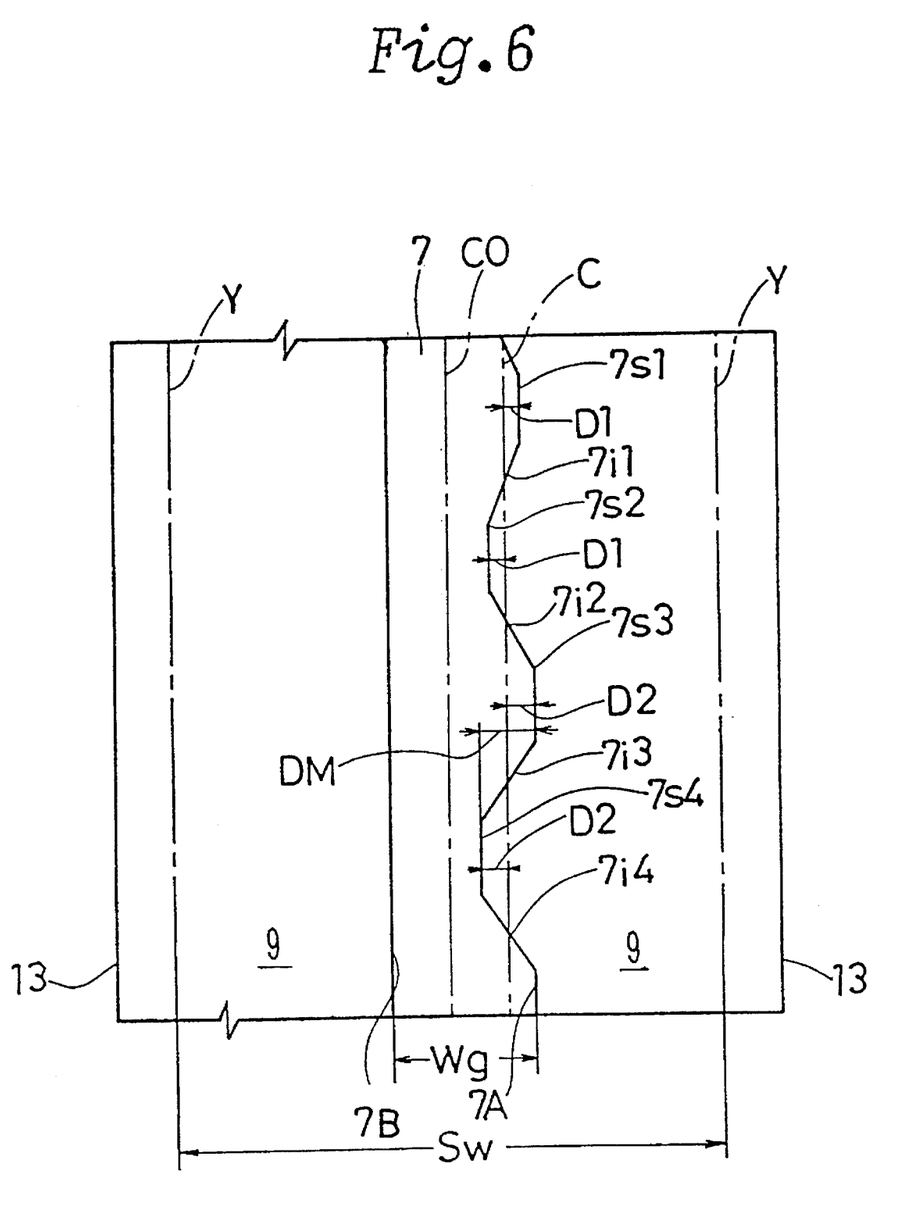
FIG. 6 is a plan view showing another example of the configuration of the circumferential groove.

FIG. 6 shows another example of the configuration of the circumferential groove 7, which is a modification of the circumferential groove 7 of FIG. 3. In this example, the side wall 7B is modified so as to extend straight in parallel with the tire equator CO, but the side wall 7A is remains unmodified. The circumferential groove 7 of this example is centered on the tire equator CO, but it can be set aside the tire equator CO by a distance (d).

Figure 7:
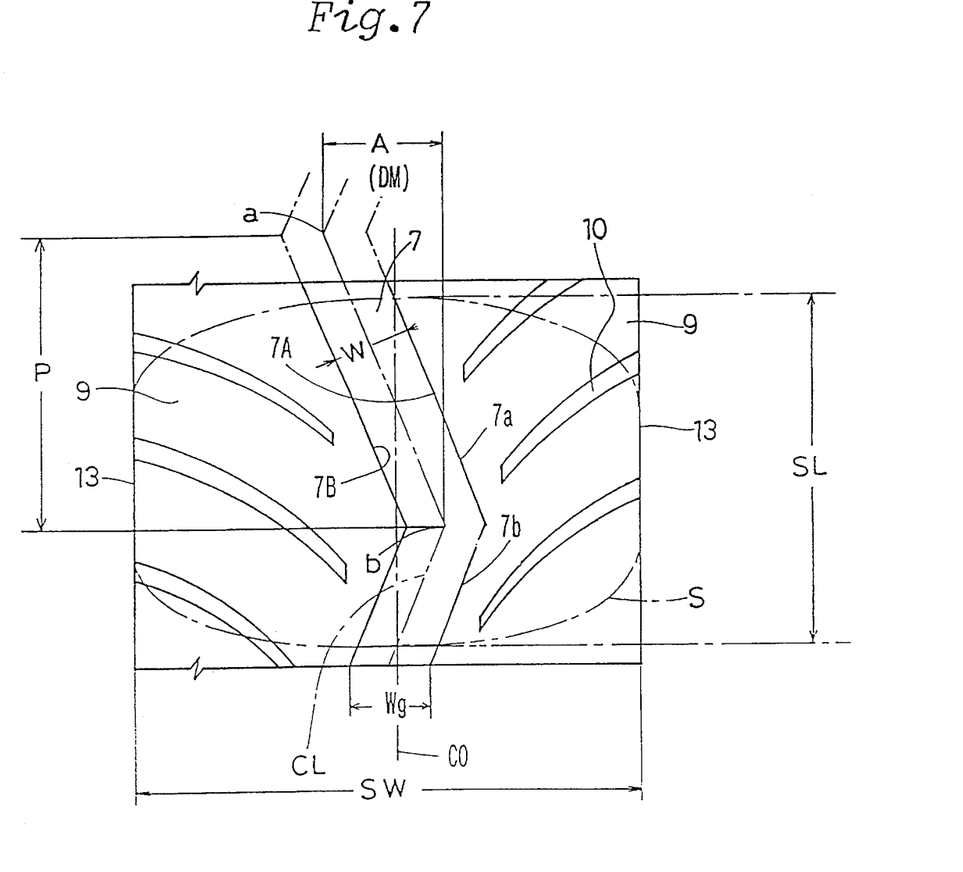
FIG. 7 is a plan view showing still another example of the configuration of the circumferential groove and an example of the tread pattern.
Figure 8:
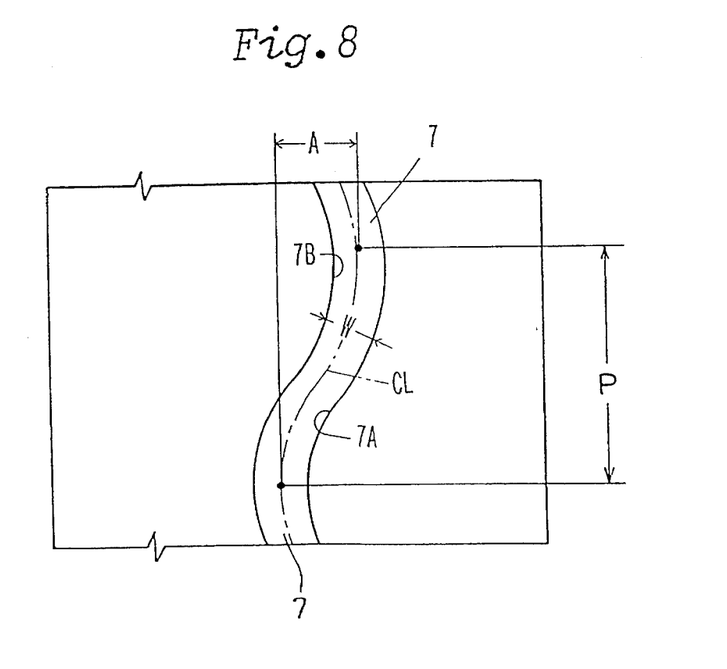
FIG. 8 is a plan view showing still more another example of the configuration of the circumferential groove.

FIGS. 7 and 8 show other examples of the configuration of the circumferential groove 7, in which the side walls 7A and 7B extend zigzag or warily in parallel with each other. In the example of FIG. 7, each of the side walls 7A and 7B of the circumferential groove 7 extends zigzag and consists of alternate straight segments $7a$ and straight segments $7b$ which are inclined in opposite directions.

In the example of FIG. 8, each of the side walls 7A and 7B of the circumferential groove 7 extends warily.

In these examples, the amplitude of the deviation is set to satisfy the following relationship:

$$A > 0.8 \times P \times W / \sqrt{(P^2 - W^2)}$$

wherein
  A is the amplitude which is an axial distance between the circumferentially adjacent peak points (a) and (b) of the center line CL of the circumferential groove 7,
  P is the pitch which is a circumferential distance between the above-mentioned peak points (a) and (b), and
  W is the groove width which is the width measured at a right angle to the center line CL of the circumferential groove 7.

If the amplitude (A) is outside the above-mentioned range, the suppression of the air resonance and the dispersion of the noise to a wide frequency range become insufficient.

Preferably, the amplitude (A) is not more than 25% of the ground contacting width SW. If the amplitude (A) is more than 25%, the angle of the circumferential groove to the tire circumferential direction becomes too large, and the rigidity of the lateral tread part is decreased thereby deteriorating the steering stability, and resulting in uneven wear resistance.

The pitch P is in the range of from 0.8 to 3 times the ground contacting length SL, which is the circumferential length of the ground contacting area under the above-mentioned standard loaded state. If the pitch P is less than 0.8 times the ground contacting length SL, the drainage performance is decreased. If the pitch P is more than 3 times SL, the air resonance noise can not be improved.

In FIG. 7, the circumferential groove 7 is centered on the tire equator CO, and a plurality of axial grooves 10 are disposed on each side thereof. The axial lengths of the axial grooves 10 are varied in proportion to the axial width of the lateral tread part 9.

Figure 9:
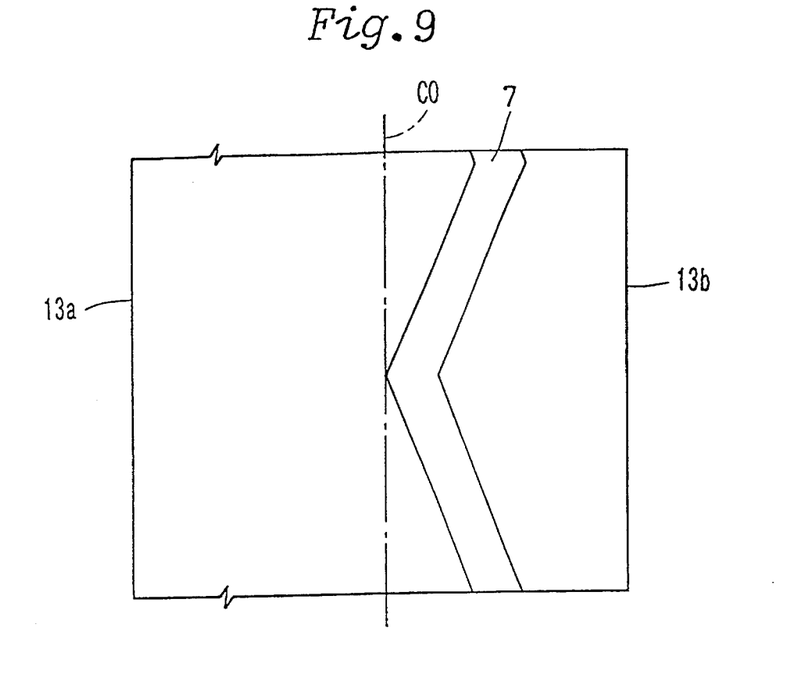
FIG. 9 is a plan view showing another example of the location of the circumferential groove of FIG. 7.

FIG. 9 shows another example of a location for the zigzag circumferential groove 7 of FIG. 7. In this example, the groove 7 is set aside from the tire equator CO. Similarly to the FIG. 5 example, the tire having this asymmetrical tread pattern is used such that the tread edge $13a$ being farther from the circumferential groove 7 is located on the outside of a car, and the nearer tread edge $13b$ on the inside of the car.

In FIGS. 7 and 9, the zigzag pitch P is constant in the circumferential direction, but it can be varied.

Figure 10:
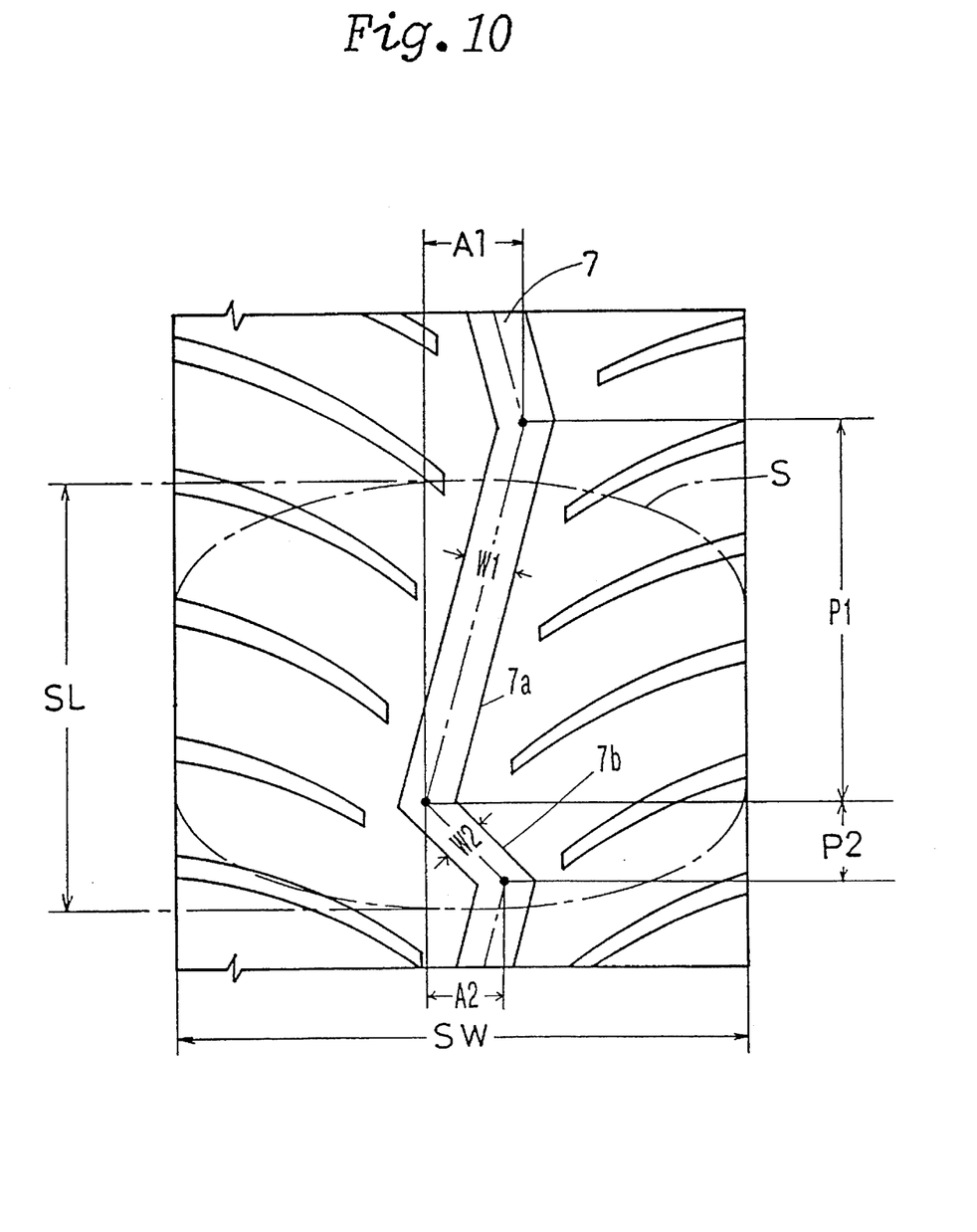
FIG. 10 is a plan view showing another example of the configuration of the circumferential groove and an example of the tread pattern.

FIG. 10 shows another example of a configuration of the circumferential groove 7, which is a modification of the above-mentioned zigzag circumferential groove 7. In this example, the zigzag consists of alternate long straight segments 7a and short straight segments 7b which are inclined in opposite directions. In each pitch, the above-explained relationship is satisfied. That is, in the long pitch P1 defined by the long segment 7a, $$A1 > 0.8 \times P1 \times W1/\sqrt{(P1^2 - W1^2)}.$$

In the short pitch P2 defined by the short segment 7b, $$A2 > 0.8 \times P2 \times W2/\sqrt{(P2^2 - W2^2)}.$$

By using a plurality of different pitches, the noise dispersion effect can be enhanced.

Figure 11:
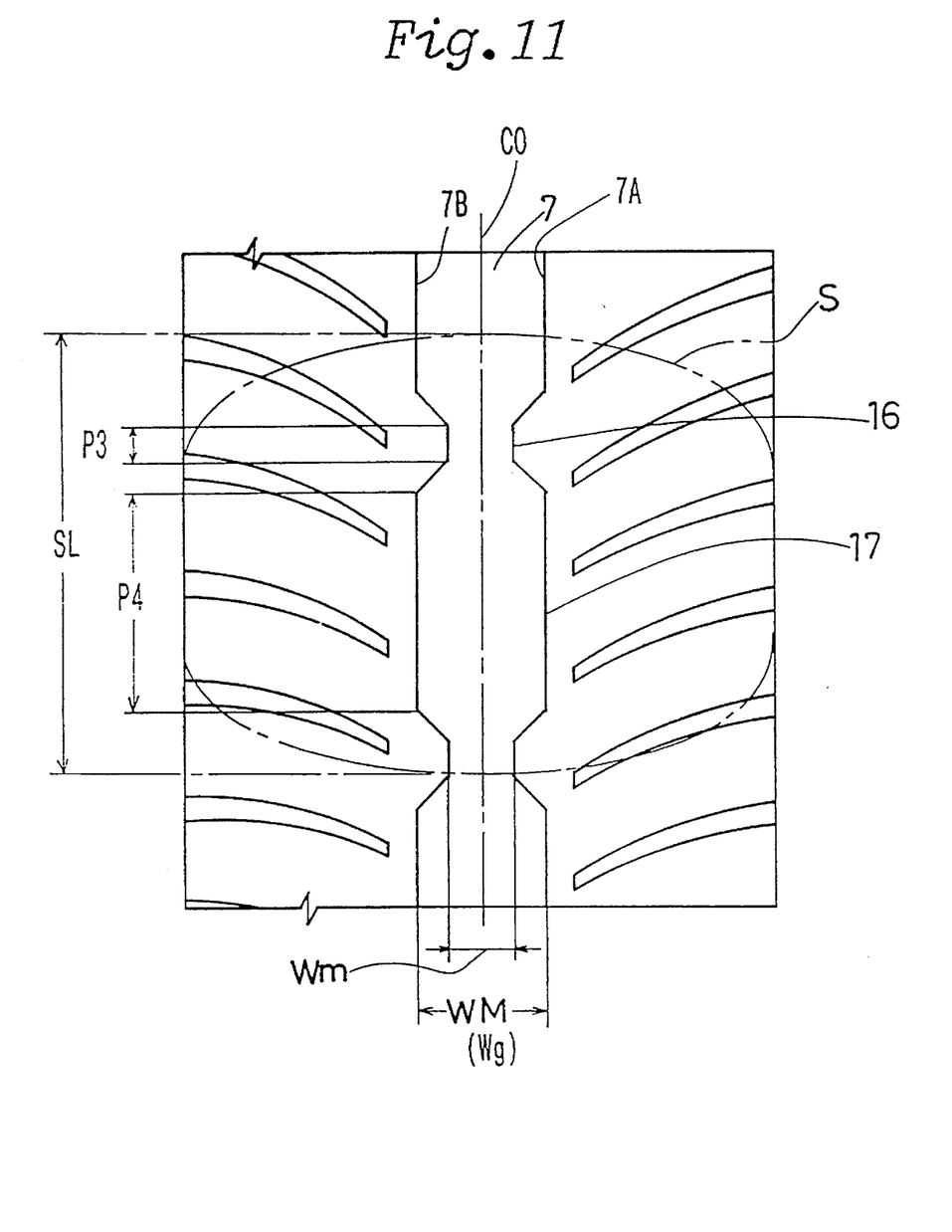
FIG. 11 is a plan view showing another example of the configuration of the circumferential groove and an example of the tread pattern.

FIG. 11 shows another example of the circumferential groove 7. In this example, the circumferential groove 7 extends generally straight in the tire circumferential direction, but the axial width thereof is periodically decreased along the length thereof to form a plurality of narrow width portions 16.

The axial width Wm of the circumferential groove 7 at each of the narrow width portions 16 is in the range of from more than 0 but not more than 0.8 times the maximum axial width WM of the circumferential groove 7. Preferably, the width Wm is in the range of from 0.1 to 0.8 times, more preferably in the range of from 0.2 to 0.6 times the maximum width WM. The maximum width WM is set in the range of from 30 to 70 mm in case of passenger tires as explained above.

The circumferential length P3 of the narrow width portion 16 is very small in comparison to the circumferential length P4 of the remaining wider portion 17.

Therefore, the pitch of the one repeating cycle, which is the total of the length P3, the length P4 and the circumferential length of the transitional part between the wide portion 17 and the narrow portion 16, is set to be smaller than the ground contacting length so that during running at least one narrow width portion 16 always exists within the ground contacting area S.

In this example, in order to form the narrow width portions 16, the side walls 7A and 7B are provided at the same circumferential positions with inwardly protruding parts 16 (deviations). As a result, the circumferential groove 7 is symmetrical about the center line thereof.

Figure 12:
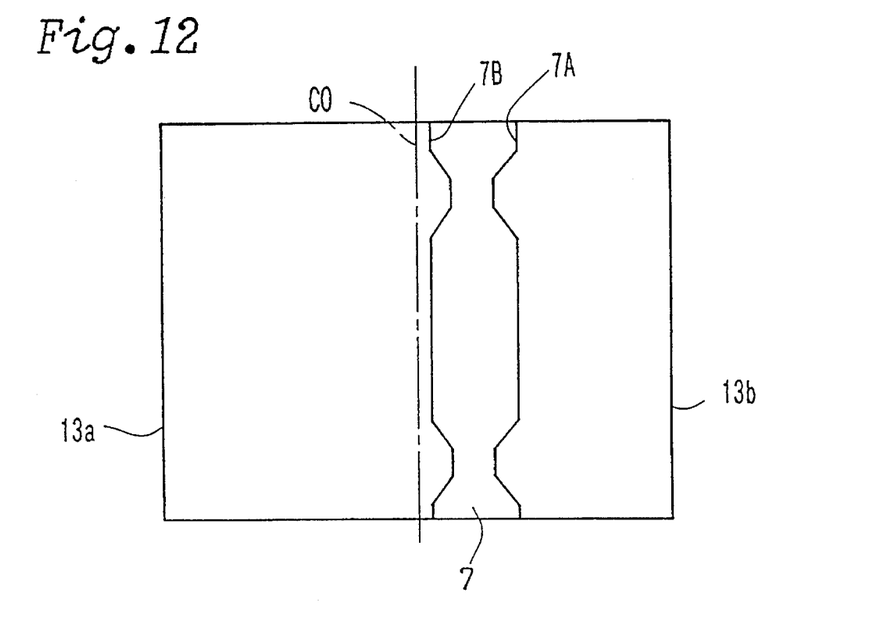
FIG. 12 is a plan view showing another example of the location of the circumferential groove of FIG. 11.

The circumferential groove 7 is centered on the tire equator CO, but it can be set aside from the tire equator CO as shown in FIG. 12.

Figure 13:
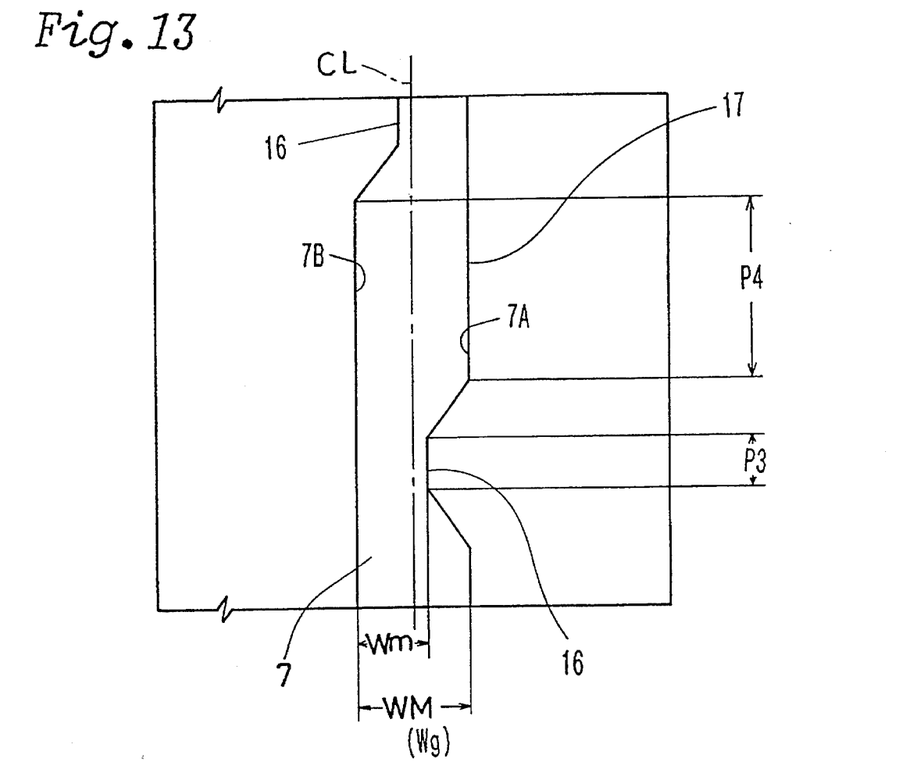
FIG. 13 is a plan view showing another example of the configuration of the circumferential groove.

FIG. 13 shows another example of the circumferential groove 7, which is a modification of the FIG. 11 groove. In this example, the protruding parts 16 of the side wall 7A and those of the other side wall 7B are staggered in the circumferential direction. As a result, the circumferential groove 7 is asymmetrical about the center line CL thereof. The widths Wm and WM also satisfy the above-explained conditions.

In FIGS. 4, 5, 7, 10, and 11, the axially outer ends of the axial grooves 10 are extended to the tread edges. The axially inner ends thereof are not extended to the circumferential groove 7, and they are terminated in the respective lateral tread portions 9, whereby the rigidity of the lateral tread parts 9 is increased to improve the steering stability and uneven wear resistance.

The width of the axial grooves 10 is in the range of from 5 to 15% of the axial width Wg of the circumferential groove 7. Preferably, the width of the axial groove is gradually increased from the inner end to the outer end thereof. Also, preferably, the number of the axial grooves is set such that during running two to four axial grooves always exist within the ground contacting area S on each side of the circumferential groove 7. If the number is less than two, the drainage performance becomes insufficient. If more than four, the tread rigidity is decreased, and the steering stability is lost.

Each of the axial grooves 10 is curved such that the angle of the groove center line with respect to the tire circumferential direction is gradually increased from the inner end toward the outer end thereof. In each lateral tread part 9, the axial grooves 10 are inclined in the same direction.

In FIGS. 4 and 5, the axial grooves 10 in one of the lateral tread parts 9 are inclined in the opposite direction to the axial grooves 10 in the other lateral tread part 9. The angle of each of the axial groove is gradually increased from the axially inner end thereof to the axial edge line Y of the ground contacting area, and then the angle is gradually decreased to the axially outer end thereof, inclining to the reverse direction. Accordingly, the maximum angle of 90 degrees lies at the axial edge line Y. The minimum angle at the axially inner end is in the range of from about 50 to 70 degrees.

In FIGS. 7, 10 and 11, the axial grooves 10 in one of the lateral tread parts 9 are inclined in the same direction as the axial grooves 10 in the other lateral tread part 9. The angle of each of the axial groove is gradually increased from the axially inner end to the outer end thereof. The maximum angle at the axially outer end is about 50 to 70 degrees. The minimum angle at the axially inner end is about 40 to 50 degrees. The angle at the middle point therebetween is less than 60 degrees.

In addition to the above-mentioned axial grooves 10, in order to improve wet grip and/or adjust the tread rigidity, sipes can be provided in the tread portion, wherein the sipe is a cut whose width is in the range of from 0.2 to 0.7 mm. Various sipes, e.g. a curved sipe, a straight sipe, a sipe connected with the circumferential groove 7, a sipe disconnected with the circumferential groove 7, etc. may be used.

In order to prevent a possible excessive deformation of the bottom of the circumferential groove 7, the circumferential groove 7 can be provided in the bottom with protrusions spaced apart from each other in the longitudinal direction of the groove. The height of such protrusions is preferably in the range of from 50 to 15% of the depth D of the circumferential groove 7.

Although illustrative preferred embodiments have thus been described herein in detail, it should be noted that will be appreciated by those skilled in the art that numerous variations may be made within the scope of this invention without departing from the principle of the invention and without sacrificing its chief advantages. The workpiece materials may be placed in their initial position in the apparatus by a mechanical means instead of the manual means presented in this disclosure. The terms and expressions have been used as terms of description and not terms of limitation. There is no intention to use the terms or expressions to exclude any equivalents of features shown and described or portions thereof and the invention should be defined in accordance with the claims which follow.

We claim:

1. A pneumatic tire comprising:

a tread portion, said tread portion provided with a circumferential groove having a pair of sidewalls and a center line located substantially equidistant from and between the two sidewalls, said circumferential groove being disposed within the ground contacting width of the tread portion in the axial direction of the tire and defined by a plurality of straight segments with parallel walls that are angled with respect to the tire equator, he straight segments being disposed in series to form a continuous zig-zag shape thereby with a plurality of axially spaced peak points located on the groove center line at each interconnection of the straight segments, the ground contacting width being the maximum axial width of the ground contacting area of the tread portion under a standard loaded state where the standard loaded state is such that the tire is mounted on a regular rim, inflated to 70% of its maximum air pressure and then loaded with 88% of its maximum load, characterized in that the axial width of said circumferential groove being in the range of from 30 to 70 mm and also in the range of from 0.2 to 0.35 times the ground contacting width, and the circumferential groove satisfies the following condition:

$$A > 0.8 \times P \times W / \sqrt{(P^2 - W^2)}$$

wherein

A is the axial distance between a first and a second circumferentially adjacent peak points on the center line of the circumferential groove, p is the circumferential distance between said first and second peak points, and W is the width of the circumferential groove measured at a right angle to the center line thereof, said circumferential distance (P) being in the range of from 0.8 to 3 times the ground contacting length, and the ground contacting length being the maximum circumferential length of said ground contacting area.

2. The pneumatic tire according to claim 1, wherein the amplitude of axial deviation between the first and second peaks of said at least one of said sidewalls is smaller than 30% of the ground contacting width, and the sea/land ratio of said ground contacting area is in the range of from 0.30 to 0.50.

3. The pneumatic tire according to claim 2, wherein said tread portion consists of only a single said circumferential groove.

4. The pneumatic tire according to claim 2, wherein said circumferential groove is disposed within a tread central region which has maximum width equal to 70% of the ground contacting width.

5. The pneumatic tire according to claim 1, wherein said tread portion includes a plurality of axial grooves, each with a width and a length, located on each side of the circumferential groove, each axial groove having an axially outer end and an axially inner end, the axially outer ends extend toward and open at the tread edges, the width of each of the axial grooves gradually increasing along its length from the axially inner end to the axially outer end.

6. The pneumatic tire according to claim 5, wherein said axially inner end extends towards but does not intersect the circumferential groove.

7. The pneumatic tire according to , claim 6, wherein each of the axial grooves has an inclination angle of less than 60 degrees with respect to the tire circumferential direction at the middle point between the tire equator and one edge of the ground contacting area.

8. The pneumatic tire according to claim 7, wherein the inclination angle of each of the axial grooves with respect to the tire circumferential direction increases gradually axially outwardly of the tire from the axially inner end to the axially outer end of each axial groove.

9. The pneumatic tire according to claim 5, wherein said axial grooves are arranged such that on each side of the circumferential groove at least two and not more than four axial grooves existing in the ground contacting area of the tread portion.

10. The pneumatic tire according to claim 1, wherein said straight segments comprises first straight segments and second straight segments wherein the length of said first straight segments measured along the circumferential groove center line is comparatively greater than the length of said second straight segments.

11. The pneumatic tire according to claim 1, wherein each of said straight segments are the same length as measured along the center line of the circumferential groove.

12. The pneumatic tire according to claim 1, wherein said circumferential groove is to one side of the tire equator on the tread portion.

13. The pneumatic tire according to claim 5, wherein the axial length of each of the respective axial grooves vary in proportion to the axial width of the tread portion at which each axial groove is located as measured from one of the sidewalls of the circumferential groove to the nearest tread edge.

* * * * *